(12) United States Patent
Ebert

(10) Patent No.: US 6,315,104 B1
(45) Date of Patent: Nov. 13, 2001

(54) ACCUMULATION CONVEYOR CONTROL SYSTEM

(75) Inventor: Jeffrey T. Ebert, Petoskey, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 09/296,253

(22) Filed: Apr. 22, 1999

Related U.S. Application Data

(60) Provisional application No. 60/082,878, filed on Apr. 24, 1998.

(51) Int. Cl.$^7$ .................................................. B65G 43/00
(52) U.S. Cl. .................................... 198/460.1; 198/781.06
(58) Field of Search ............................ 198/460.1, 781.06

(56) References Cited

U.S. PATENT DOCUMENTS

| | | | |
|---|---|---|---|
| 3,225,893 | * 12/1965 | Currie | 198/127 |
| 3,612,248 | * 10/1971 | Wallis | 198/37 |
| 3,724,642 | * 4/1973 | Good | 198/781.06 |
| 3,768,630 | * 10/1973 | Inwood et al. | 198/781.06 |
| 3,960,262 | * 6/1976 | Henig | 198/127 |
| 4,227,607 | 10/1980 | Malavenda | |
| 4,240,538 | * 12/1980 | Hawkes et al. | 198/358 |
| 4,264,004 | * 4/1981 | Harwick | 198/781.06 |
| 4,293,065 | * 10/1981 | Dyer et al. | 198/781.06 |
| 4,383,605 | * 5/1983 | Harwick | 198/781.06 |
| 4,453,627 | * 6/1984 | Wilkins | 198/781.06 |
| 4,461,382 | * 7/1984 | Hoover et al. | 198/781.06 |
| 4,499,991 | * 2/1985 | Allen | 198/465.1 |
| 4,572,353 | 2/1986 | Felder . | |
| 4,585,042 | * 4/1986 | Hutson | 144/208.8 |
| 4,781,283 | 11/1988 | Bentley et al. . | |
| 4,817,784 | 4/1989 | Judge . | |

(List continued on next page.)

FOREIGN PATENT DOCUMENTS

| | | |
|---|---|---|
| 2166753 | 3/1971 | (DE) . |
| 0484098 A1 | 5/1992 | (EP) . |
| 2164311 A | 3/1986 | (GB) . |
| 07149412 | 6/1995 | (JP) . |

OTHER PUBLICATIONS

Smart Conveyor Keeps Packages From Colliding, (*Machine Design*, Jan. 8, 1989).
Mobile storage–rack applications, Accumulation Conveyor (*modern Materials Handling*).
Smart conveyor system employs distributed control, (*Design News*, Feb. 17, 1997).
Innovations from SICK Optic–Electronic Industrial Sensors, WTR, Keeps Roller Conveyors Moving "EZ–Logic" Conveyor, (*Modern Materials Handling*).
Roller conveyor gently accumulates packages, (reprinted from *Power Transmission Design*, Oct. 1992).
The ZONEX Module, (*Interroll*).
The Driving Force, New Product Announcement Control, (*Interroll*).
DRIVEROLL Rollers, *Interroll*).

*Primary Examiner*—Joseph E. Valenza
*Assistant Examiner*—Rashmi Sharma
(74) *Attorney, Agent, or Firm*—Dickinson Wright PLLC

(57) ABSTRACT

An accumulation conveyor control system includes a number of accumulation zone conveyors, each equipped with a control module coupled with an electronically controlled clutch. The system includes one motor linked to each accumulation conveyor for driving of the conveyor rollers. The clutch links a drive roller on each conveyor with the motor via a drive member such as a chain. The control module controls operation of the conveyors by sensing the presence or absence of an article in the path of one or more of the article sensors. When the path is blocked signifying the presence of an article, the module sends a signal upstream and receives signals from downstream zones to control roller operation for each zone. The system allows a unitary installment of a number of zones using a single power source and without the need for mechanical devices such as trigger switches or PLCs.

13 Claims, 8 Drawing Sheets

U.S. PATENT DOCUMENTS

| | | |
|---|---|---|
| 4,919,255 | 4/1990 | Morgan et al. . |
| 5,016,748 | 5/1991 | Garzelloni . |
| 5,042,644 | 8/1991 | Davis . |
| 5,058,727 | 10/1991 | Jahns et al. . |
| 5,060,785 | 10/1991 | Garrity . |
| 5,070,995 | 12/1991 | Schaffer et al. . |
| 5,083,655 | 1/1992 | Becker . |
| 5,086,910 | 2/1992 | Terpstra . |
| 5,186,417 * | 2/1993 | Pritchard .................... 244/137.1 |
| 5,201,397 * | 4/1993 | Isaacs ................................ 198/395 |
| 5,285,887 * | 2/1994 | Hall ..................................... 198/460 |
| 5,540,323 * | 7/1996 | Schiesser et al. ............... 198/781.06 |
| 5,577,593 * | 11/1996 | Hooper ............................ 198/346.1 |
| 5,823,319 * | 10/1998 | Resnick et al. ................. 198/781.06 |
| 5,862,907 * | 1/1999 | Taylor ............................. 198/781.05 |
| 5,901,398 * | 5/1999 | Ishikawa et al. ..................... 15/53.3 |
| 6,021,888 * | 2/2000 | Itoh et al. ............................. 198/783 |
| 6,047,812 * | 4/2000 | Horn et al. ...................... 198/781.06 |
| 6,071,063 * | 6/2000 | McGrath et al. .................... 414/529 |

\* cited by examiner

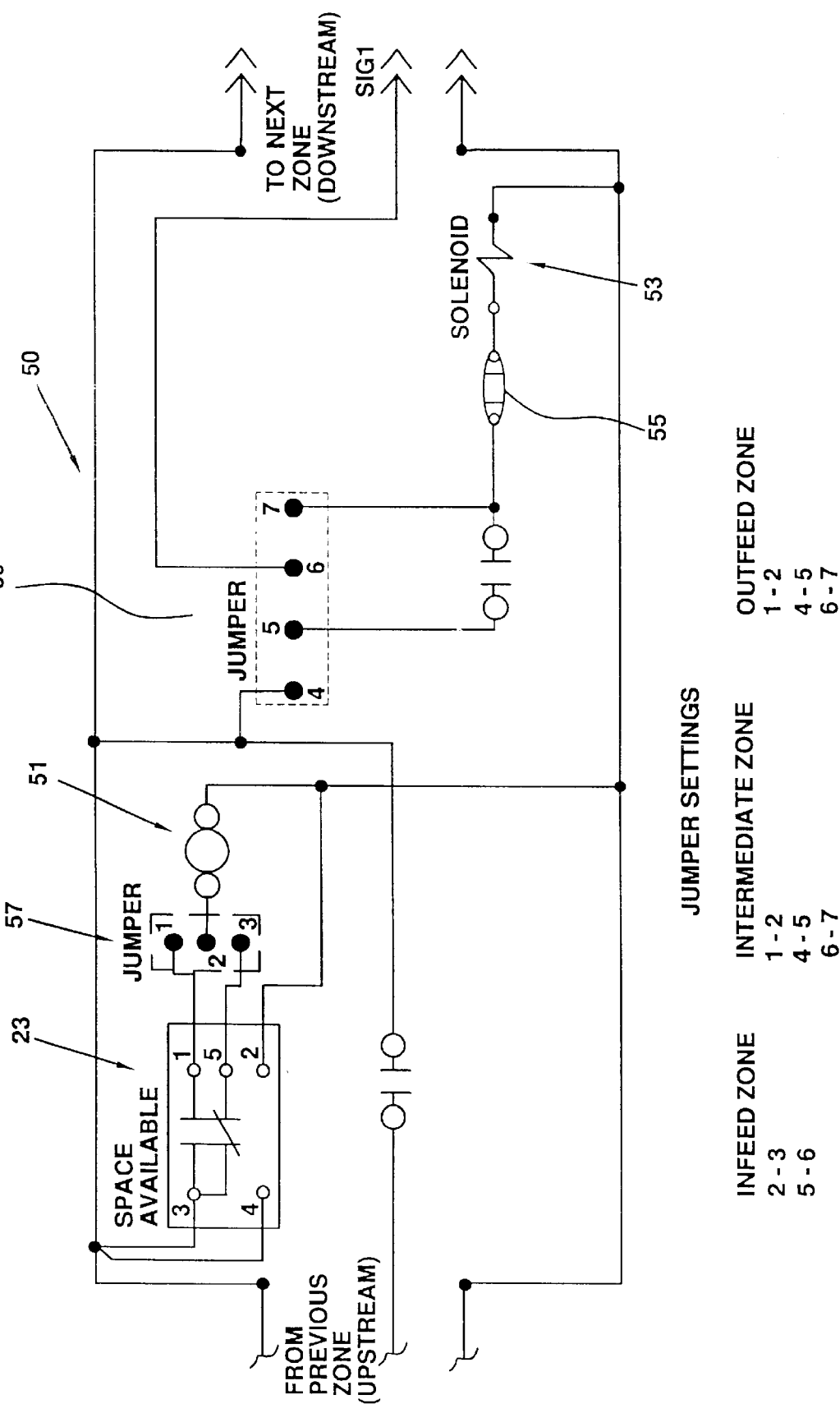

ACCUMULATION CONVEYOR CONTROL SYSTEM

This application claims the benefit of U.S. provisional patent application 60/082,878, filed Apr. 24, 1998.

FIELD OF THE INVENTION

The present invention is directed to an accumulation conveyor control system and, in particular, to a system that employs zone control modules that are linked together to control conveyor operation without the need for a PLC or mechanical triggered devices.

BACKGROUND ART

Traditional "zero pressure" pallet accumulation conveyors (PAC) have utilized mechanical sensors and actuators. In one mode, as a product moves into a zone of these conveyors, a mechanical sensor is triggered. The sensor is linked to a mechanical actuator. The actuator then reacts with a clutch mechanism of the zone to either enable or disable the zone's movement. Using this concept, conveyor motors typically run continuously and the conveyor is often noisy due to the mechanical actuation of the zone. Where mechanical setups have not been either feasible or desirable, electrical sensors and actuators have been used. These devices have typically been connected to an external programmable logic controller (PLC). Software is then implemented that allows the PLC to control the conveyor in a similar fashion. Using these concepts results in unusually long setup times for either adjustment and/or wiring.

One example of an accumulation conveyor is disclosed in U.S. Pat. No. 5,042,644 to Davis. This patent discloses a zero pressure accumulation conveyor using a trigger assembly for the accumulation control. The trigger assembly is positioned along the conveyor run and is coupled to cam follower arms and valve bodies. Depression of the trigger assembly depresses the valve body, allowing air to pass from an air supply to a brake assembly cylinder. The brake assembly cylinder then restrains a torque tube thus isolating the driving force imparted by the drive shaft to the conveyor rollers.

U.S. Pat. No. 5,060,785 to Garrity discloses a control arrangement for an accumulating conveyer having a plurality of zones, each zone including an electrically-powered sensor. A logic circuit is associated with each sensor, the logic circuit comprising a first input, a second input from the sensor of its zone, a first output which sends a signal to the activator for that zone and a second output to send a signal to the input for the next zone. A circuit for each electronic sensor communicates with the circuit before and after itself to control the system. In this system, electronic sensors are used to indicate the presence of an article in a given zone. When the electric sensor senses an article blocking the sensing path, the signal interacts with the logic circuit to control the operation of the accumulation conveyor.

Accumulation conveyors using mechanical sensors and actuators are not without their disadvantages. First, in any system, the actuator reacts with a clutch mechanism of the zone to either enable or disable the conveyor's movement in that zone. Using this system, the conveyor motors typically run continuously. Moreover, the conveyor is often noisy due to the mechanical actuation of the zone.

While these mechanical systems have been replaced with electrical systems such as that disclosed in the Garrity patent, these electrical systems are not without their disadvantages either. The electrical systems containing logic circuits take an unusually long time for setup due to adjustments and/or wiring.

In light of the disadvantages noted above, a need has developed to provide accumulation conveyor controls which overcome the prior art's disadvantages. In response to this need, the present invention provides an accumulation conveyor control which eliminates both mechanical control such as trigger mechanisms, pneumatic systems, and logic circuit control devices.

SUMMARY OF THE INVENTION

Accordingly, it is a first object of the present invention to provide an improved accumulation conveyor control system.

Another object of the present invention is a control module for each zone of an accumulation conveyor.

A still further object of the present invention is an accumulation conveyor system which eliminates the need for mechanical and programmable logic circuits.

One other object of the present invention is a method of accumulating articles on an accumulation conveyor without the need for controls that require mechanical assist and/or software implementation.

Other objects and advantages of the present invention will become apparent as a description thereof proceeds.

In satisfaction of the foregoing objects and advantages, the present invention provides an improvement in accumulation conveyor systems comprising a plurality of conveyor zones, the conveyor zones including an infeed conveyor zone, at least one intermediate conveyor zone, and an outfeed conveyor zone, each zone having at least one driving roller and a plurality of following rollers, the driving roller linked to a drive by a clutch mechanism. In one aspect of the invention, the improved system comprises a sensor for each zone, each sensor capable of detecting a presence or absence of an article in a respective zone, and a solenoid for each zone. Each solenoid is linked to each zone clutch mechanism. A relay for energizing or de-energizing the solenoid to electrically actuate or de-actuate the clutch mechanism of each zone is provided, relay operation based on a presence or an absence of an article in a space of each zone and a presence or absence of an article in a space of a downstream zone. Actuation of the clutch mechanism permits zone roller operation and deactuation of the clutch mechanism prevents zone roller operation.

A motor control center can be provided to link a single power source to a single motor, the motor control center including a transformer to step down the power source for powering each control module. The motor can be linked to each clutch mechanism by a drive member. In this way, one system having the motor, motor control center and various zones can be installed and connected to a single source of power.

The motor control center can include means for powering the motor only when the presence of an article is detected for the plurality of conveyor zones. The relays for each zone can be contained in a housing and each zone solenoid can be arranged with each zone clutch mechanism. The relay and the solenoid of each zone can be linked via jumper connections, the jumper connections configurable based on whether the zone is an infeed zone, an intermediate zone, and an outfeed zone to determine whether space or no space energizes a respective solenoid for zone operation. The relays can be contained in a housing to be mounted on a frame of each zone as a control module for each zone. The housings can be equipped with quick connect couplings and connectors to facilitate linking the control modules of the various zones together.

In another embodiment, the infeed and outfeed conveyor control modules can be additionally linked to one or more PLCs to interface with systems other than the accumulation conveyor control system, e.g., devices upstream of the infeed conveyor or downstream of the outfeed conveyor and the like.

BRIEF DESCRIPTION OF THE DRAWINGS

Reference is now made to the drawings of the invention wherein:

FIG. 3 is an electrical circuit schematic of the control module of FIG. 1 with a key showing jumper settings;

DESCRIPTION OF THE PREFERRED EMBODIMENTS

The present invention presents a new solution for controlling pallet accumulation conveyors. Using electrical sensors, actuators and a zone control module, each zone of the pallet accumulation conveyor is electrically linked to the next. A network of control modules interact to control the entire conveyor. Mechanical devices in the path of articles being conveyed are eliminated and a PLC is not necessarily required. This pallet accumulation conveyor control offers the following benefits;

1. Minimized setup time, no adjustments are necessary.
2. Quiet operation, no mechanical sensors and the conveyor only runs when necessary.
3. Reduced costs, no PLC and complicated wiring to deal with. No air or electrical piping required.
4. Easy to maintain, all control modules can be identical and are made from standard industrial products. Quick disconnects allow for fast replacement of failed components.
5. No minimum or maximum load requirements.

This module is designed to replace the trigger roll and mechanical linkage for each zone of the conveyor as used in prior art designs. Although the inventive design appears more expensive than the conventional mechanical linkage, setup time is reduced and a considerable cost savings is realized to the pallet accumulation conveyor applications that cannot use trigger roll mechanisms, i.e., 3" roll centers. The inventive system is ideally suited for heavy duty applications wherein the conveyors transport articles ranging from 500–6,000 pounds/load.

As will be described in more detail below when referring to the FIGS., the control module mounts to each zone of the pallet accumulation conveyor. Each zone is linked together using a single quick-disconnect cable. The module is configurable for infeed, outfeed, and intermediate zones using jumper plugs. An optional timer can be added to the infeed and outfeed zones to allow for loading and unloading of the pallet accumulation conveyor. Using this configuration, no additional control devices, i.e., PLCs, are needed to run a basic pallet accumulation conveyor system.

Wire hook-up is simple. After connecting each zone to the next, 120 VAC power is connected to the infeed zone. An additional 480 VAC power feed is then supplied to the motor with all the traditional motor control protection and starting devices.

The control module can be made from standard industrial products. The controls can be housed in a 4"×6 polycarbonate enclosure. An adjustable cable is prewired to connect to the next zone, and a receptacle is provided to connect from a previous zone. Quick-disconnect cables are also installed for the solenoid and photo-eye (photo-eye and reflector are included as part of the module). Internally, a relay isolates the photo-eye from the solenoid circuit. A fuse is also supplied for the solenoid to protect against solenoid failure. Jumper plugs are supplied for configuring the modules' function.

Figure 1:
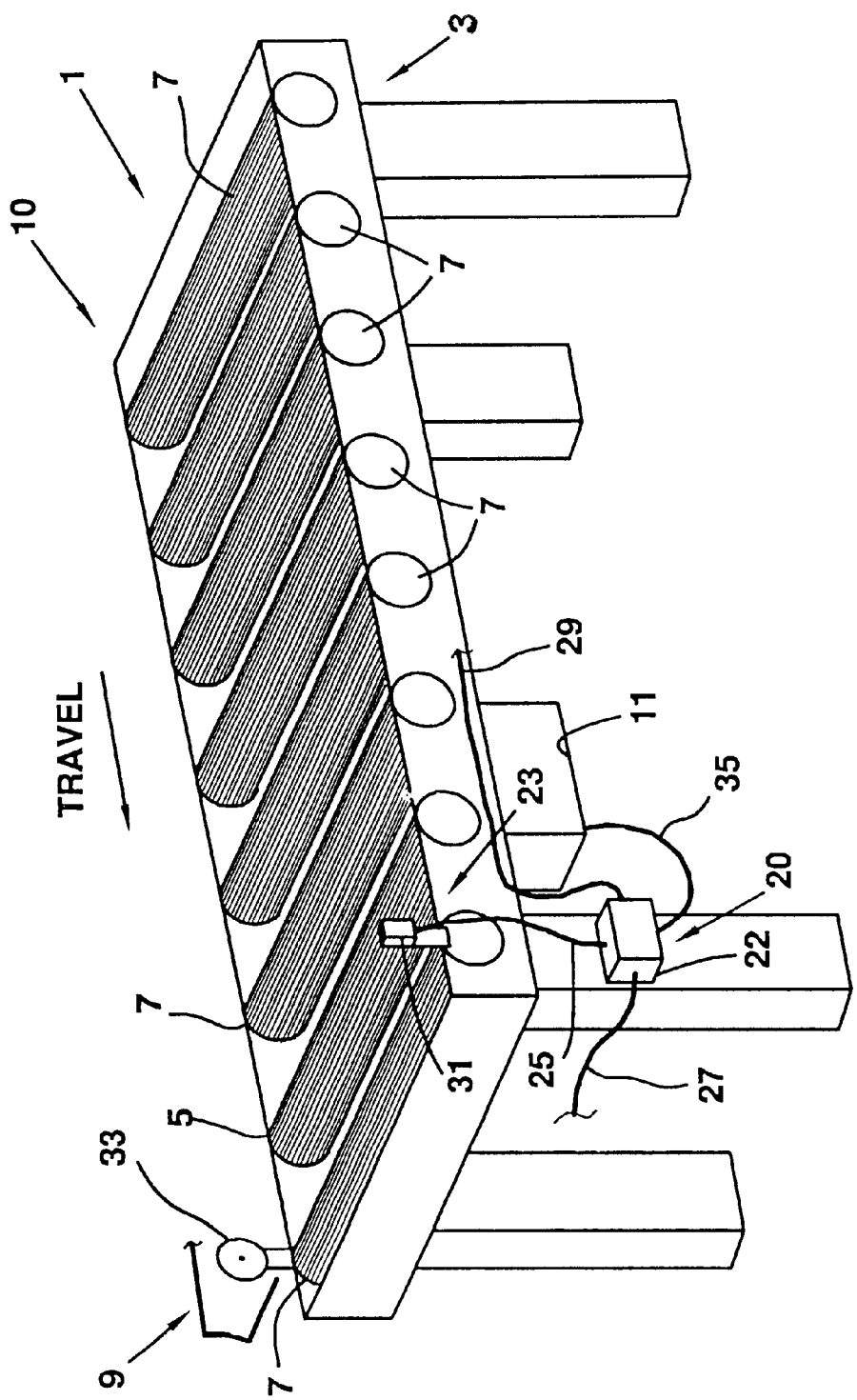
FIG. 1 is a perspective view of one embodiment of the invention showing one accumulation conveyor and a control therefor.

Referring to FIG. 1, an exemplary accumulation conveyor zone of an accumulation conveyor system is designated by the reference numeral 10. The zone 10 includes a conveyor section 1 including a frame 3, driving roller 5 and following Hollers 7. The driving roller 5 is linked to a motor (see FIG. 4), by a drive member represented by reference numeral 9 and an electronically actuated clutch 11. The motor is designed to drive the driving roller 5 of each zone in the overall system. The driving roller 5 is then linked to each of the following rollers 7 so that all rollers rotate when the motor is operating when the clutch 11 links the drive member 9 to the driving roller 5.

The electrically actuated clutch 11 interfaces with the drive member 9, e.g., a chain, and the driving roller 5 by a sprocket or other means. The clutch 11 either engages or disengages the driving roller 5 from the drive member 9 to either rotate the rollers for a given zone or interrupt roller driving.

It should be understood that the conveyor components including the driving roller 5, following rollers 7, drive member 9, and frame 3 are conventional components and do not need further description for understanding of the invention.

Each zone 10 includes a control module 20 including a housing 22 enclosing control module components therein. A photo-eye sensor 23 is provided which is linked to the control module 20 via the connector 25. The module 20 also includes a connector 27 which connects via a quick-connect coupling (not shown) to a previous or downstream zone.

A connector 29 is shown which links the module 20 to the next or upstream zone. The connector 29 has a quick-connect coupling (not shown) at the end connecting to the module 20. The other end is linked to the upstream or next zone in a same fashion that connector 27 is linked to the module 20. The photo-eye sensor 23 is a conventional type which senses whether space is available between the light emitting component 31 and the reflector 33.

Figure 2:
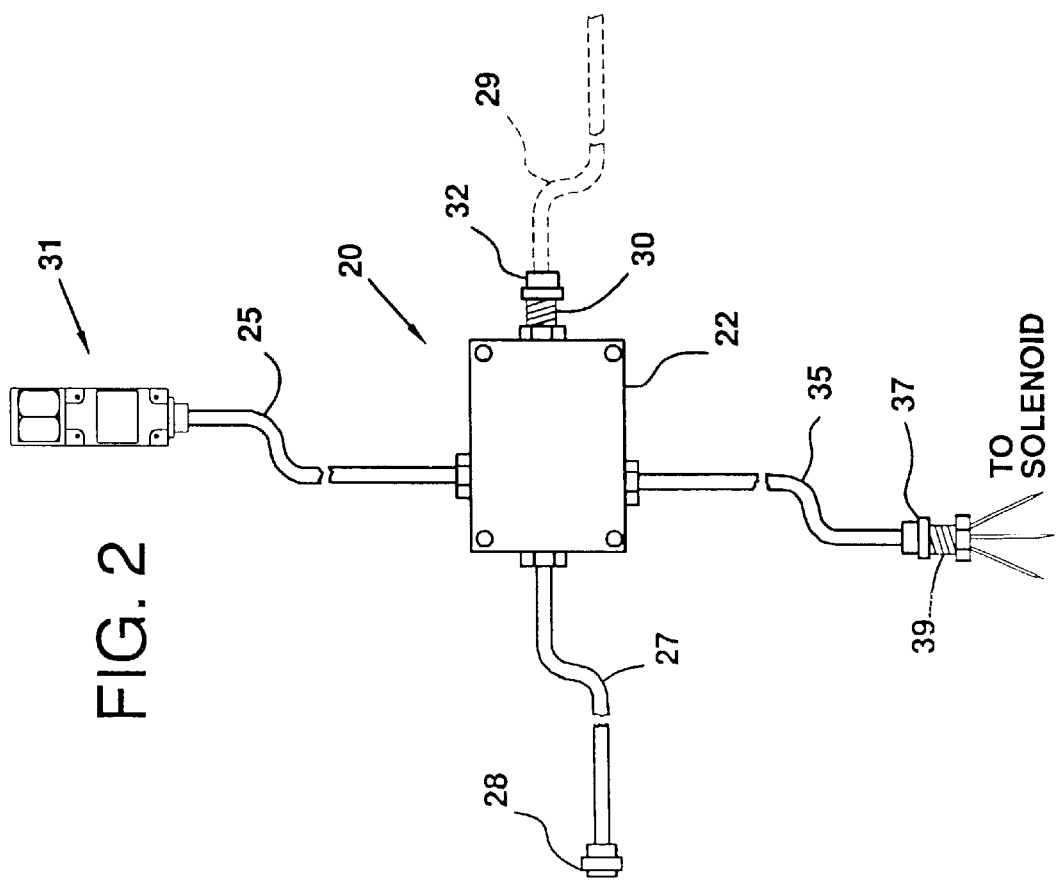
FIG. 2 shows an exterior view of the control module of FIG. 1.

FIG. 2 depicts the control module 20 enlarged to show greater detail. In this Figure, the connector 27 is shown with a quick-connect female coupling half 28. The housing 22 also has a male quick-connect coupling half 30 adapted to connect to the female quick connect coupling half 32 of the upstream zone connector 29.

The connector 35 is provided which has a female quick-connector coupling half 37 adapted to connect to a male quick-connect coupling 39 mounted on a housing of the clutch 11. The connector 35 houses wiring as will be described in more detail below which controls a solenoid which in turn actuates the clutch 11 for conveyor operation.

FIG. 3 shows how an exemplary circuit to control the conveyor operation by electronically controlling the clutch 11. The control includes either driving the rollers if space is available or stopping the zone operation if no space is available so that articles being conveyed do not contact each other and incur possible damage. The circuit is designated by the reference numeral 50. In its broadest sense, the circuit uses a relay 51 to isolate the photo-eye sensor 23 and a solenoid 53. The solenoid 53 also has a fuse 55 to protect against solenoid failure. Jumper plugs 57 and 59 are also supplied for configuring the modules depending on the location of each zone, i.e., an infeed zone, and one or more intermediate zones, an outfeed zone.

Referring to the key of FIG. 3, the jumpers 57 and 59 are connected a certain way if the zone 10 is at the infeed or first zone of the accumulation conveyor system, and another way if the zone 10 is either located in an intermediate location in the system or at the outfeed or last zone. More specifically, for an infeed zone operation, contacts 2 and 3 are jumpered together as are contacts 5 and 6. For an intermediate zone operation, contacts 1 and 2 are jumpered together, as are contacts 4 and 5 and 6 and 7, respectively.

Figure 4:
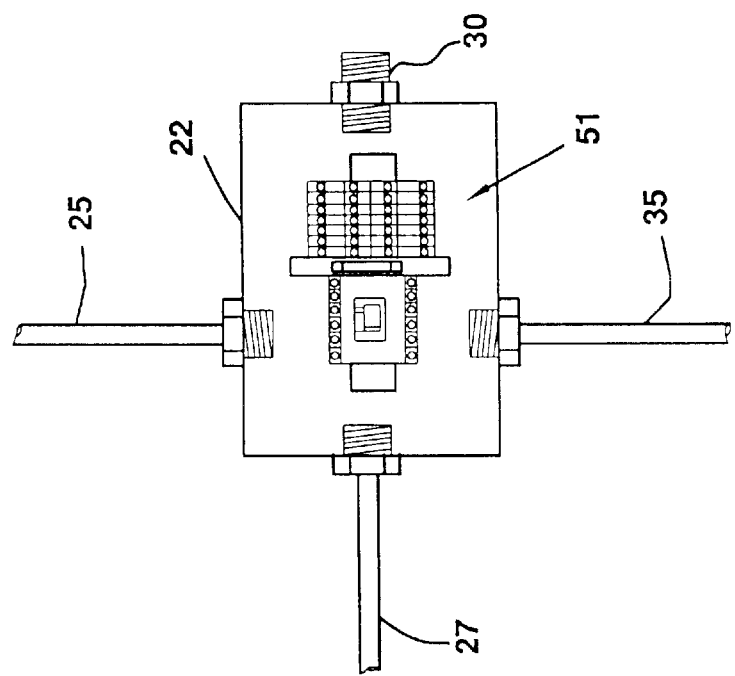
FIG. 4 is an internal view of the module of FIG. 1.

FIG. 4 more clearly shows the components within the housing 22 of the module 20. The relay 51 and the jumpers 55 and 57 are enclosed within the housing 22 with the photo-eye sensor 23 being located downstream of the connector 25, and the solenoid 53 being downstream of the connector 35.

The control modules 20 can be linked together to form a network. The control modules interact with each other to control the "normally running" conveyor. Normally running in this case means that the conveyor motor is continuously running. This is often an undesirable trait which causes unnecessary wear and noise on the conveyor. The network of the control modules can be equipped with the addition of specialized pallet accumulation conveyor motor control center. The infeed and outfeed zones of the conveyor are connected directly to the motor control center. This center extends the functionality of the pallet accumulation conveyor by offering the following advantages:

1. 120 VAC power to the sensor network is generated from the motor control center. A separate power feed is not required to run the sensors and
2. All over-load and over-current protection as well as motor starting devices are provided. No additional equipment to run the conveyor is needed. A simple 480VAC power drop is all that is necessary to run the conveyor.
3. Using the signals from the infeed and outfeed zones, the motor is normally "sleeping". It only runs for a predetermined time interval when a change occurs on the conveyor and then returns to the sleep mode.

Figure 5:
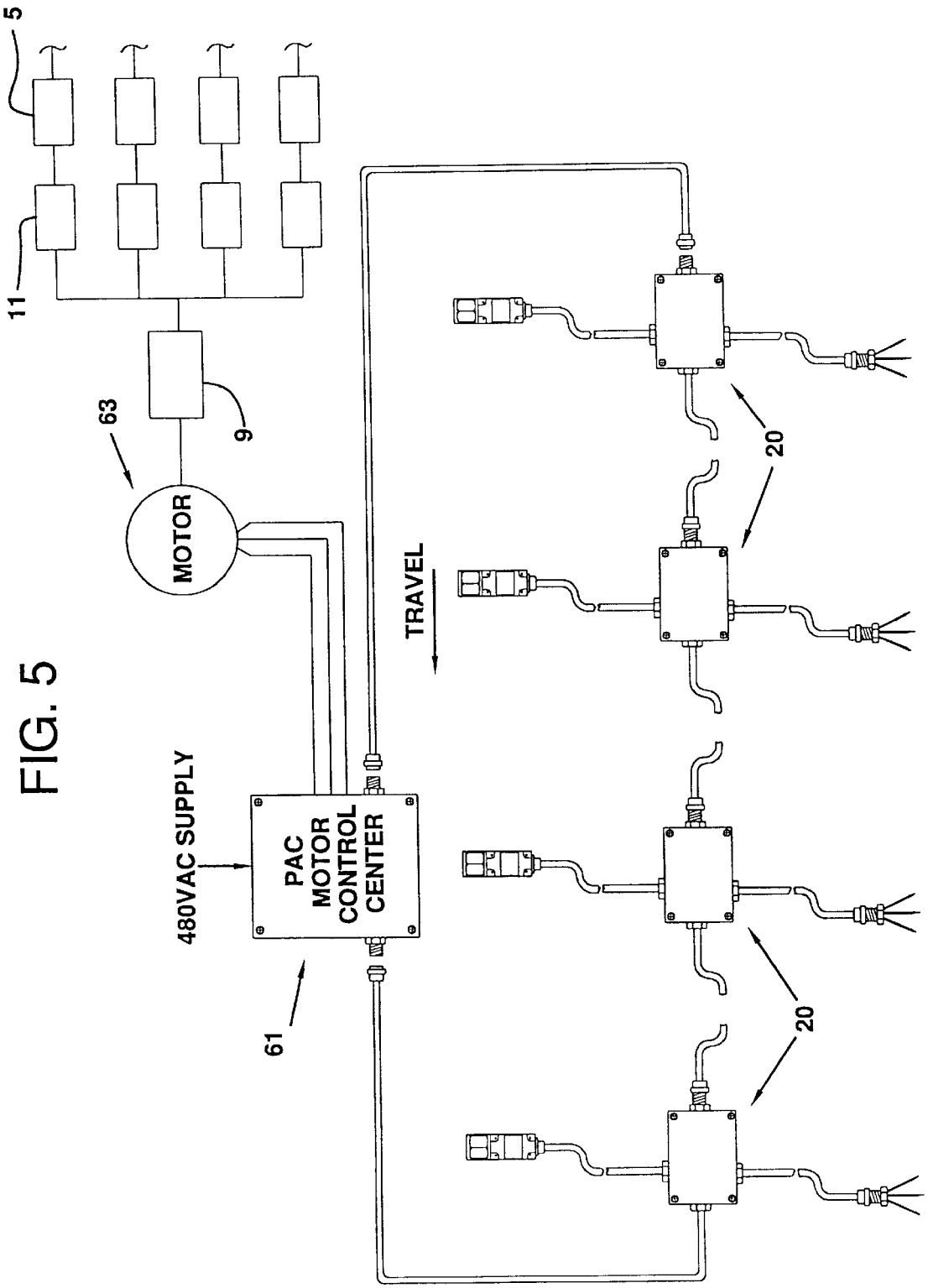
FIG. 5 shows a network of modules and the network linked to a motor control center.
Figure 6:
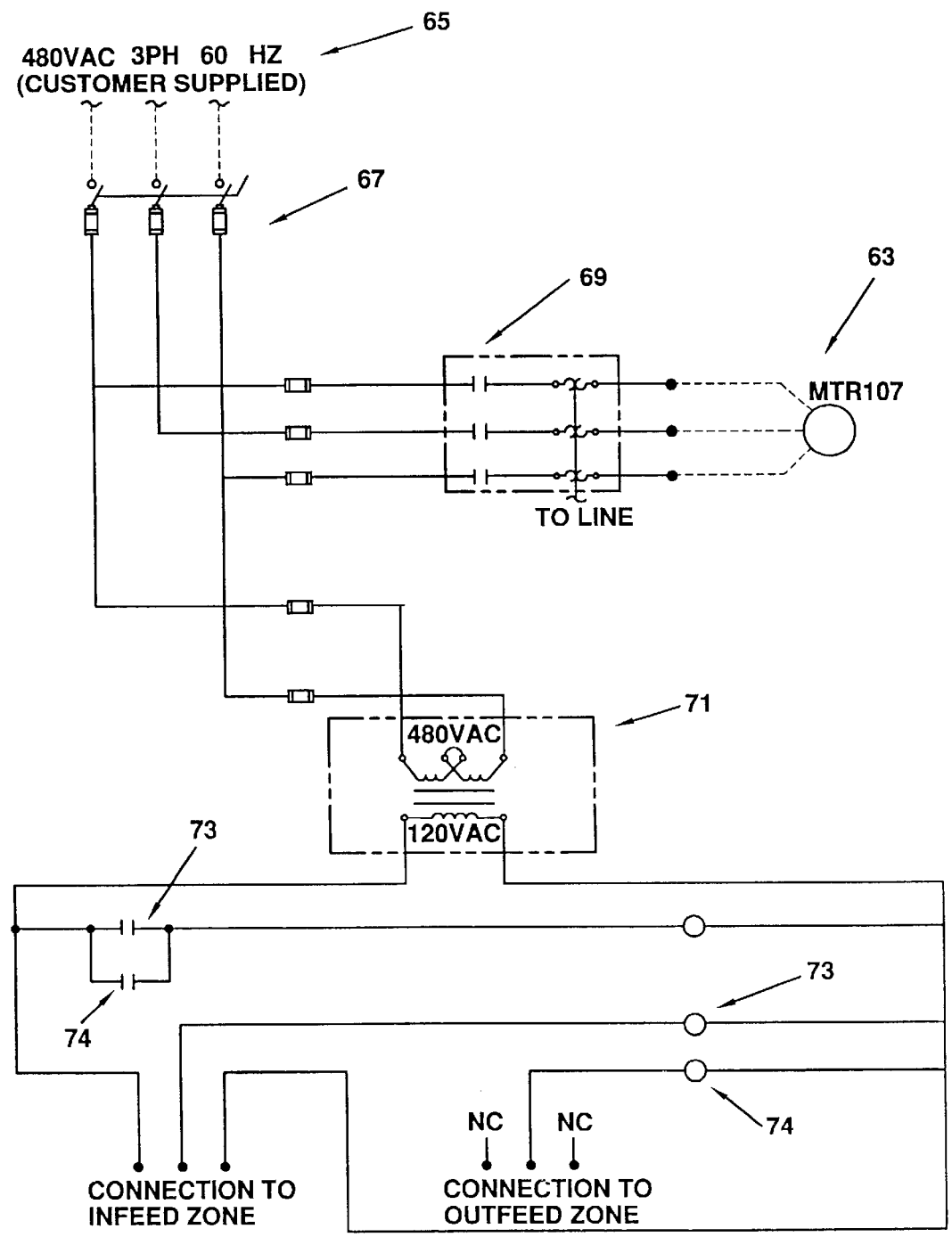
FIG. 6 is an electrical schematic of the motor control center of FIG. 5.

FIGS. 5 and 6 exemplify the network control described above. FIG. 5 shows an exemplary system whereby four modules would be connected together as part of a four zone accumulation conveyor system, one infeed, two intermediate zones, and one outfeed zone. The control modules 20 can be grouped together with a motor control center 61 and a motor 63. As, described above, the motor 63 is linked to the driving rollers 5 of the four zones depicted in FIG. 5 via the clutch 11 of each zone. Although not shown, each of the driving rollers 5 is then linked to the following rollers 7 of each zone for rotation and conveyance of an article.

FIG. 6 shows an exemplary schematic electrical circuit of the motor control center 61. A 480 volt power supply 65 is provided to the motor 63. The power supply is controlled by the switches 67 and the motor 63 has conventional starter and overload circuitry 69.

The 480 volt power supply 65 is also connected to a transformer 71 that steps down the voltage to 120 volts. This 120 volt power supply is then supplied to the control modules for their operation. The motor control system can also include a sleeper system whereby the motor 63 is normally sleeping based on signals from the infeed and outfeed zones. The motor only runs for a predetermined time interval when a change occurs on the conveyor and then returns to the sleep mode. This sleep system is achieved by using a time-delayed relay 73 and 74. When the infeed zone indicates that a load is present, a signal from the infeed zone is sent to the motor control center and relay 73 is energized. Motor starter 69 is activated and motor 63 runs as long as the infeed zone senses a load. When the load moves to the next zone relay 73 is de-energized. The contacts of relay 73 remain closed until the "time off" sequence of the relay expires. The contacts for relay 73 then open and motor 63 stops until again the infeed zone is loaded.

The outfeed zone sends a space available signal to the motor control center when a load has been removed from the outfeed zone. This signal energizes relay 74 and activates motor starter 69 and motor 63. When the outfeed zone is again loaded, relay 74 de-energizes and the "time off" sequence delays the opening of the contacts on relay 74. When the time cycle expires, the contacts for relay 74 open and motor 63 turns off. The cycle repeats when a load is removed from the outfeed zone.

Figure 7:
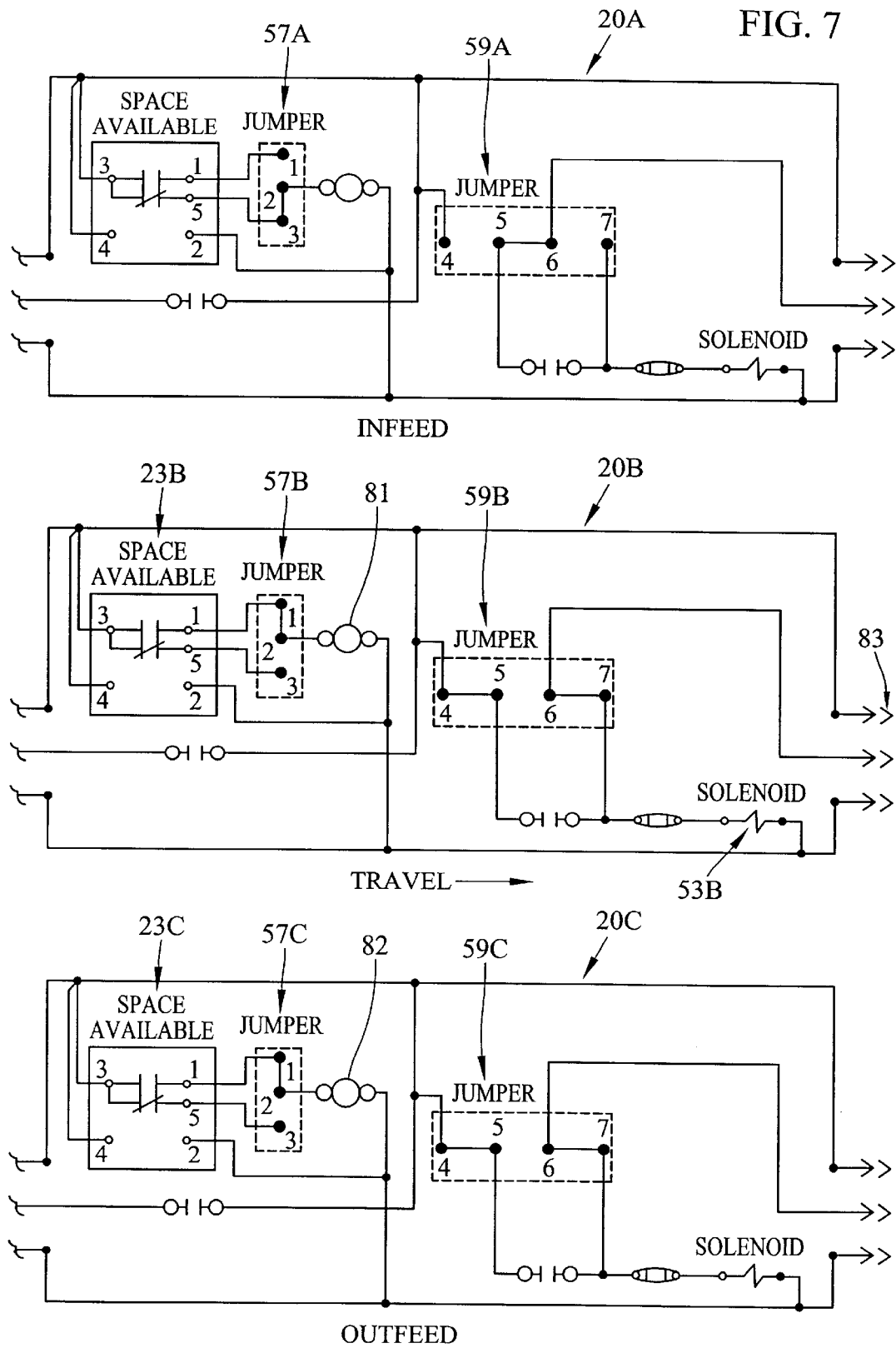
FIG. 7 depicts a three zone conveyor system showing electrical circuits for each zone.

FIG. 7 shows a three zone accumulation conveyor system comprising zones 20A, 20B and 20C. Zone 20A represents the infeed zone A, 20B represents the intermediate zone B and 20C represents the outfeed zone C. The electrical circuitry is shown with the appropriate jumper settings for each zone. Zone 20A has contacts 2 and 3 of jumper 57A connected and contacts 5 and 6 of jumper 59A connected. A similar jumper arrangement is shown for 20B and 20C since the outfeed and intermediate zone jumper settings are the same as shown, see the key in FIG. 3. The outfeed zone 20C shows connections between contacts 1 and 2 of jumper 57C and 4 and 5 and 6 and 7 of jumper 59C.

In a basic operation, the module 20 sends a signal to the upstream zone as to whether space is available or not and also receives a signal from the downstream zone as to whether space is available in the downstream zone. Based on this input and output, the solenoids are either energized or de-energized to control the overall operation of the accumulation conveyor system.

When the photo sensor detects a load in the zone, the relay is de-energized thereby deactivating the solenoid and stopping the zone. The zone is now under control of the downstream zone. The downstream zone will send a signal to the upstream zone when it has space available. This signal bypasses the relay signal of the upstream zone and activates its solenoid. Hence, with a load in the upstream zone and no load downstream, the load is allowed to continue.

For example, with a load present in zone 20B, relay 81 is de-energized and not allowed to power the solenoid. With no power to the solenoid, zone 20B will stop. When zone 20C has space available, its relay 82 is energized and allows this zone to run. The signal from relay 82 is sent to zone 20B via signal 83. This signal bypasses relay 81 and energizes zone 20B solenoid. This allows the load to move from zone 20B to zone 20C.

Figure 8:
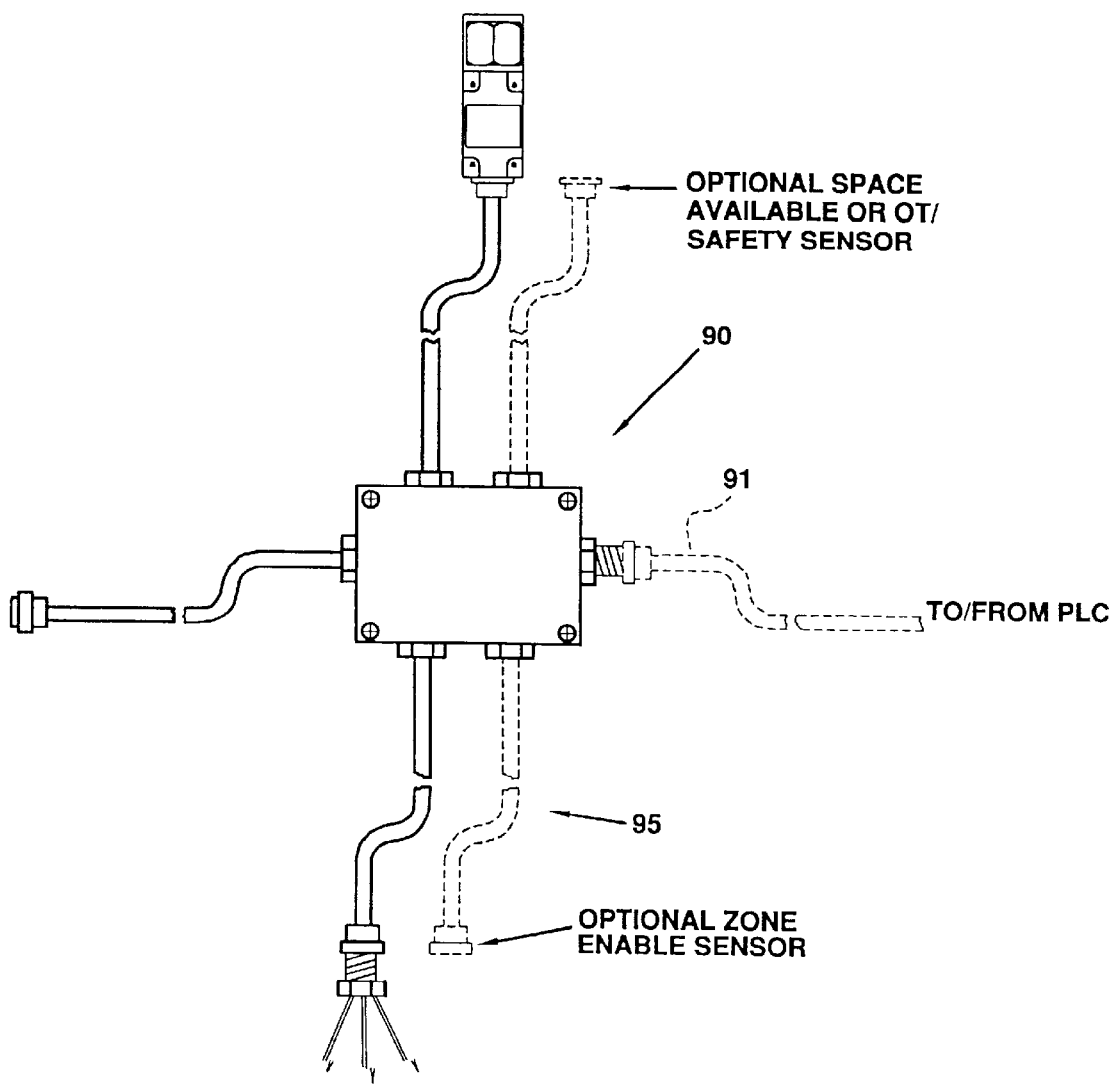
FIG. 8 shows a second embodiment of the control module.
Figure 9:
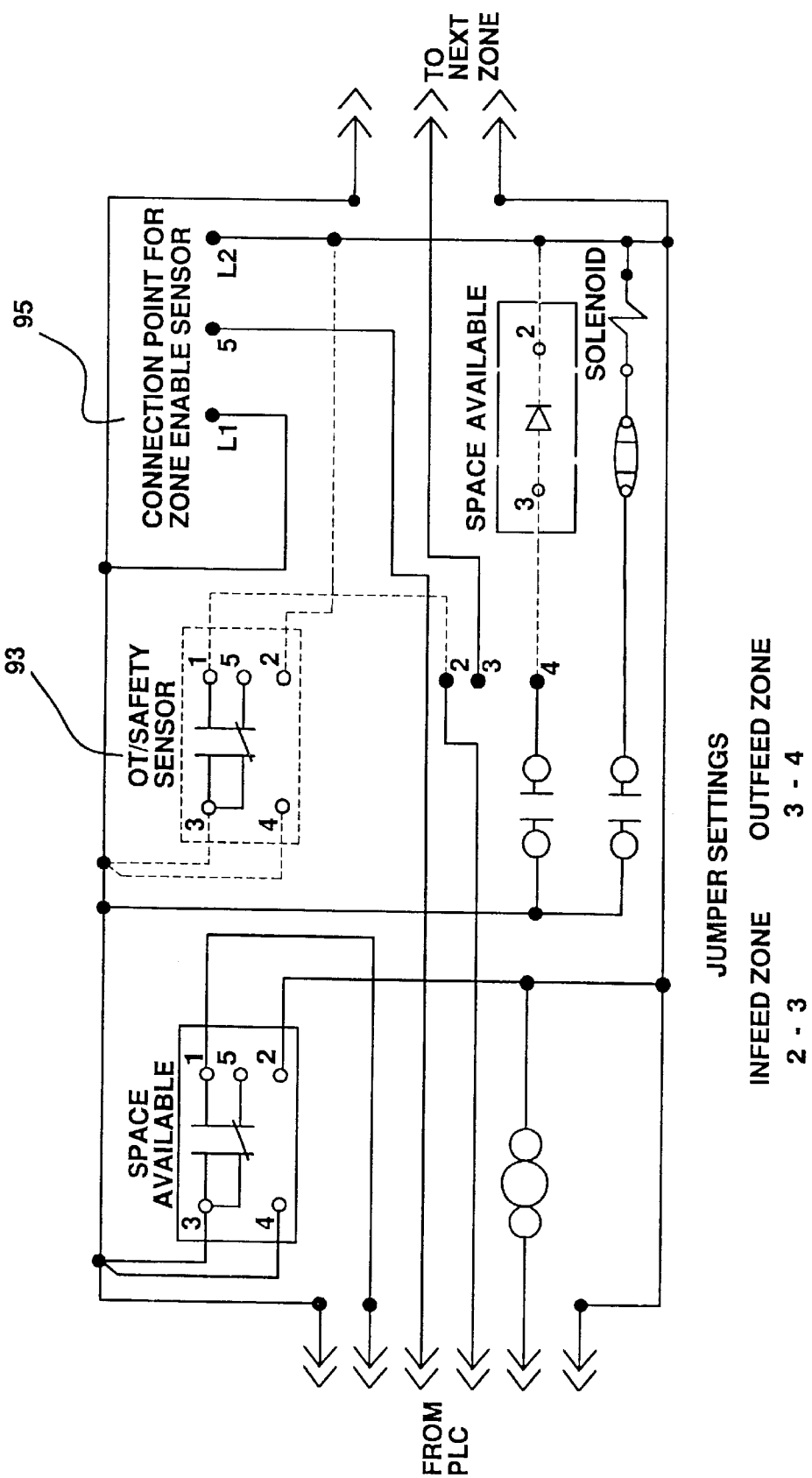
FIG. 9 is an electrical schematic of the control module of FIG. 8 with a key showing jumper settings.

For applications where pallet accumulation conveyor is integrated into other system conveyors, and/or AGV systems, a variation of the control module is available as shown in FIGS. 8 and 9. This variation offers similar characteristics as the base module 20, however it allows the infeed control and outfeed control zones to be controlled by a PLC. This variation replaces the infeed and outfeed control modules described above. Connection to a PLC control panel is accomplished using a single quick-disconnect cable from the infeed and outfeed zone. Additional sensors are added to the module as needed such as AGV handshake optics, over-travel safety sensors, fork truck detection sensors or dry contacts from other conveyor equipment.

Referring now to FIGS. 8 and 9, an alternative embodiment of the control module 20 of FIG. 1 is designated by the reference numeral 90. In this embodiment, the infeed and outfeed zones, for example, 20A and 20C of FIG. 7, can be controlled by a PLC. This variation replaces the infeed and outfeed control modules configuration as shown in FIG. 3. Connection to a PLC control panel (not shown) is accomplished using a single quick-connect cable 91 from the infeed and outfeed zones. In this embodiment, additional sensors can be added to the module as needed such as automatic guided vehicle handshake optics, over-travel safety sensors, fork truck detection sensors or dry contacts from other equipment. With the system shown in FIGS. 8 and 9, the infeed and outfeed conveyors can be linked to other systems for their control. For example, it may be desirable to link the operation of the infeed conveyor with another system conveyor. Use of the module 90 as the infeed module of an accumulation conveyor system would permit such control. Similarly, an outfeed zone could be equipped with the module 90 for linking the outfeed zone to another system conveyor or the like.

FIG. 9 shows an exemplary circuit diagram with jumper settings for both the infeed and outfeed zones. This diagram also shows the circuitry for an over-travel safety sensor 93, and a connection 95 for a zone enable sensor.

In addition to simplifying the wiring required for this type of conveyor for the FIGS. 8 and 9 embodiment, the over-all number of I/O required for a PLC to control the conveyor is significantly reduced. For example, using a configuration of a Modicon 984-145 PLC without the inventive control module and assuming the PLC is connected to five "10 zone" pallet accumulation conveyors, fifteen of the available seventeen slots are used to control the conveyor. In comparison, when using the same PLC using the inventive control modules, only six slots of the available seventeen are utilized, yet functionally the conveyors would operate the same. This is a reduction of (9) I/O cards, (2) 5-slot chassis and the associated labor and wire.

While the conveyor system is often described as a pallet accumulation control system, any type of load can be conveyed with the inventive system and method. Further, other conveyor zone systems than that identified in FIG. 1 can be used with the module control system. Similarly, other means can be used to energize or de-energize the clutch in substitution for the solenoid. Similarly, the jumper connections can be made using other known connections that enable each control module to be tailored to its placement in the overall conveyor system.

As such, an invention has been disclosed in terms of preferred embodiments thereof which fulfills each and every one of the objects of the present invention as set forth above and provides new and improved accumulation conveyor control system and module therefor, and a method of accumulating articles on a conveyor.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. An accumulation conveyor control system comprising;
   a) a plurality of conveyor zones, the conveyor zones including an infeed conveyor zone, at least one intermediate conveyor zone, and an outfeed conveyor zone, each zone having at least one driving roller and a plurality of following rollers, the driving roller linked to a drive by a clutch mechanism;
   b) a sensor for each zone, each sensor capable of detecting a presence or absence of an article in a respective zone;
   c) a solenoid for each zone, each solenoid linked to each zone clutch mechanism; and
   d) a relay energizing or de-energizing the solenoid to electrically actuate or de-actuate the clutch mechanism of each zone based on a presence or an absence of an article in a space of each zone and a presence or absence of an article in a space of a downstream zone, actuation of the clutch mechanism permitting zone roller operation and de-actuation of the clutch mechanism preventing zone roller operation.

2. The system of claim 1, further comprising a motor control center linking a single power source to a single motor and to each control module, the single motor linked to each clutch mechanism by a drive member.

3. The system of claim 2, further comprising means for powering the motor only when the presence of an article is detected in the plurality of conveyor zones.

4. The system of claim 1, wherein the drive comprises a single motor and a drive member linking each clutch mechanism to the single motor.

5. The system of claim 1, wherein the relay for each zone is contained in a housing and each zone solenoid is arranged with each zone clutch mechanism.

6. The system of claim 1, wherein the relay and the solenoid of each zone are linked via jumper connections, the jumper connections configurable based on whether the zone is an infeed zone, an intermediate zone, and an outfeed zone to determine whether space or no space energizes a respective solenoid.

7. The system of claim 5, wherein the relay and the solenoid of each zone are linked via jumper connections, the jumper connections configurable based on whether the zone is an infeed zone, an intermediate zone, and an outfeed zone to determine whether space or no space energizes the solenoid, the jumper connections arranged within the housing.

8. The system of claim 5, wherein each housing has a first connector linking with a downstream housing via a quick connect coupling and a second connector linking with the solenoid in the clutch mechanism via a quick connect coupling.

9. The system of claim 1, further comprising at least one programmable logic controller linked to one or both of the infeed and outfeed zones for controlling infeed and outfeed zone operation in combination with a system upstream or downstream of the plurality of conveyor zones.

10. An accumulation conveyor control system comprising:
    a) a plurality of conveyor zones, the conveyor zones including an infeed conveyor zone, at least one intermediate conveyor zone, and an outfeed conveyor zone, each zone having at least one driving roller and a plurality of following rollers, the driving roller linked to a drive by a clutch mechanism, wherein the drive comprises a single motor and a drive member linking each clutch mechanism to the single motor, b) a sensor for each zone, each sensor capable of detecting a presence or absence of an article in a respective zone, c) a solenoid for each zone, each solenoid linked to each zone clutch mechanism;

d) a relay energizing or de-energizing the solenoid to electrically actuate or de-actuate the clutch mechanism of each zone based on a presence or an absence of an article in a space of each zone and a presence or absence of an article in a space of a downstream zone, actuation of the clutch mechanism permitting zone roller operation and de-actuation of the clutch mechanism preventing zone roller operation; and e) a motor control center linking a single power source to the motor, the motor control center including a transformer to step down the power source for powering each control module.

11. The system of claim 10, further comprising means for powering the motor only when the presence of an article is detected in the plurality of conveyor zones.

12. The system of claim 11, wherein the relay for each zone is contained in a housing and each zone solenoid is arranged with each zone clutch mechanism.

13. The system of claim 12, wherein the relay and the solenoid of each zone are linked via jumper connections, the jumper connections configurable based on whether the zone is an infeed zone, an intermediate zone, and an outfeed zone to determine whether space or no space energizes the solenoid, the jumper connections arranged within the housing.

* * * * *